Aug. 13, 1940.   W. W. HALLINAN   2,210,976
VARIABLE SPEED PULLEY
Filed March 15, 1938   2 Sheets-Sheet 1

INVENTOR
W. W. HALLINAN
BY
Cook & Robinson ATTORNEYS

Aug. 13, 1940.    W. W. HALLINAN    2,210,976
VARIABLE SPEED PULLEY
Filed March 15, 1938    2 Sheets-Sheet 2
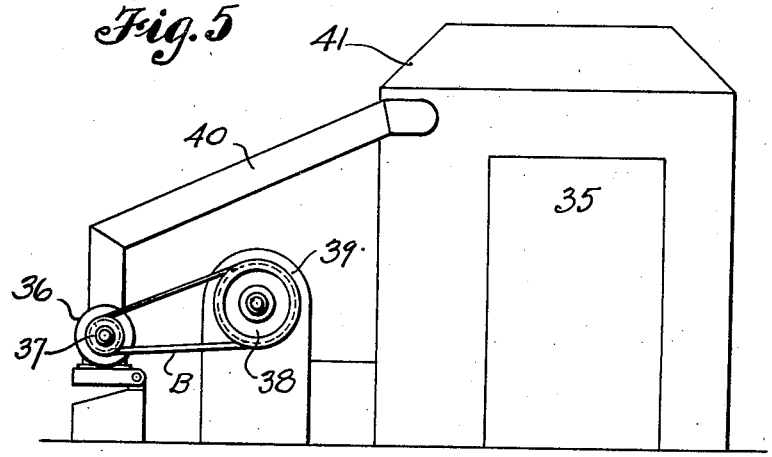
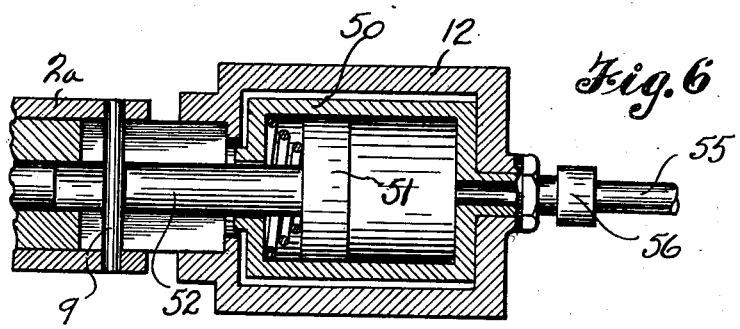
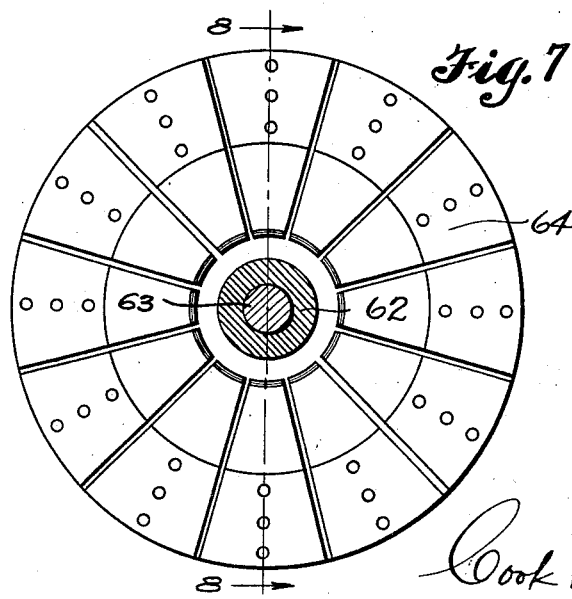
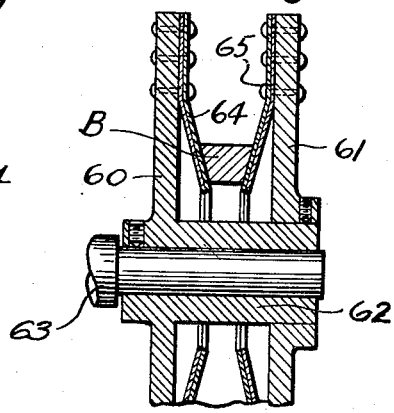
INVENTOR
W. W. HALLINAN
BY
Cook & Robinson ATTORNEY

Patented Aug. 13, 1940

2,210,976

UNITED STATES PATENT OFFICE 2,210,976

VARIABLE SPEED PULLEY

William W. Hallinan, Dowagiac, Mich.

Application March 15, 1938, Serial No. 196,003

5 Claims. (Cl. 74—230.17)

This invention relates to variable speed pulleys and to various uses thereof, and it has reference more particularly to pulleys equipped with, or associated with, means operable in accordance with and under control of temperature or pressure changes to effect an automatic adjustment of the pulley, either while it is in motion or idle, for the purpose of varying the effective diameter of the pulley and consequently varying the speed of a belt driven thereby.

The invention further relates to the automatic control of air circulation in heating systems or in air conditioning devices by employment of variable speed pulleys of the above kind.

It is the principal object of the present invention to provide a pulley of the character above stated, designed for the driving of what is generally referred to as a V-belt, and comprising opposite side sections which, respectively, form the opposite side walls of the pulley groove wherein the driven belt is received, and which sections are automatically regulated in spacing by a novel means adapted to be placed either under thermostatic or under pressure control to vary the effective diameter of the pulley in accordance with change of temperature or pressure.

It is also an object of this invention to utilize pulleys of the character above stated for the operation of air circulating fans as employed in combination with heat and air conditioning systems, thereby to provide for faster or slower circulation of air automatically in accordance with the rise or fall of temperature.

Other objects of the invention reside in the details of construction and combination of parts of the pulley and in their mode of operation as will hereinafter be fully described.

Still further objects reside in the use of the pulley in combination with air circulating means as used in air conditioning plants.

In accomplishing the above and other objects of the invention, I have provided the improved details of construction, the preferred forms of which are illustrated in the accompanying drawings, wherein—

Fig. 5 is a view diagrammatically illustrating the use of the present pulley in an air conditioning plant.

Fig. 6 is a detail illustrating the adaptation of the pulley for operation under control of a pressure medium.

Fig. 7 is a cross sectional view of a pulley of alternative form of construction for temperature control, employing bimetal disks in the formation of the opposite walls of the pulley groove.

Fig. 8 is a cross section of the device as seen on the line 8—8 in Fig. 7.

Referring more in detail to the drawings—

Figure 1:
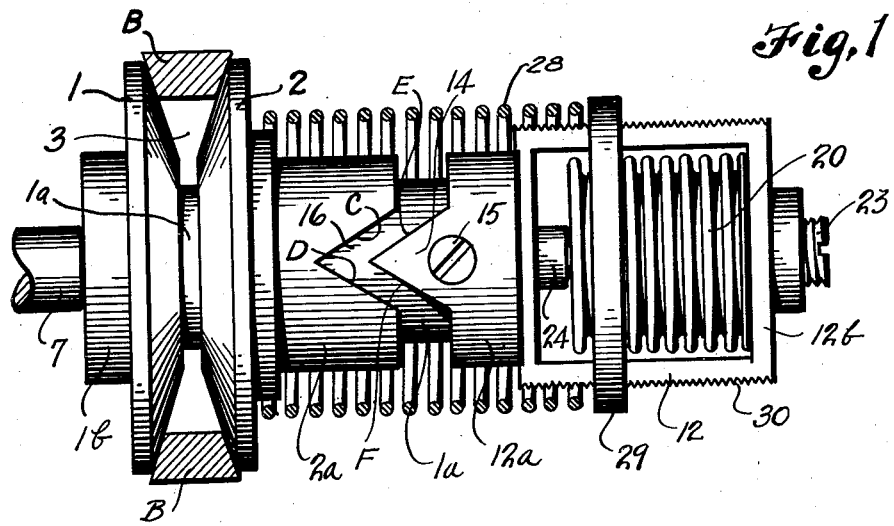
Fig. 1 is a side view of an automatically adjustable and variable speed pulley embodied by the present invention; the tensioning spring being shown in section for clearer illustration of parts covered thereby.
Figure 2:
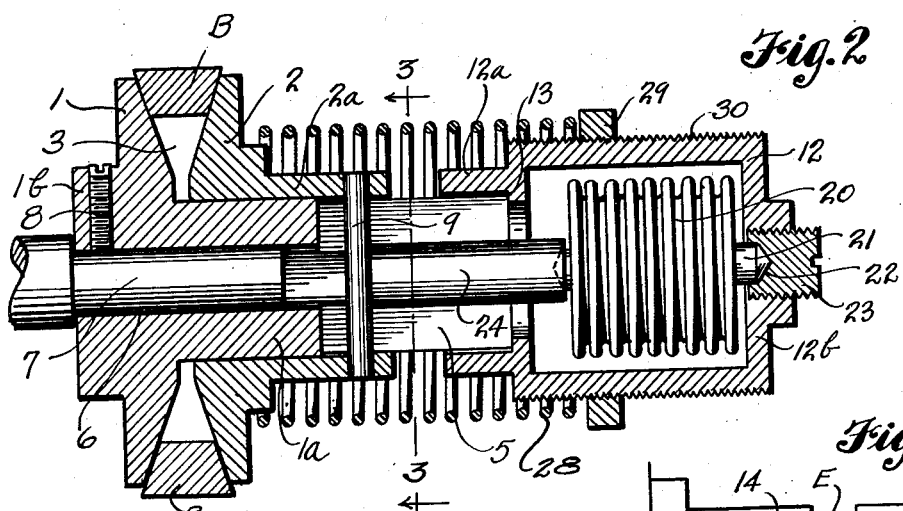
Fig. 2 is a longitudinal, sectional view of the same.

It is first to be understood that the present pulley is designed primarily for use in connection with belts of that kind referred to as "V-belts," and which are characterized by having flat opposite side surfaces of substantial width and in converging planes, giving the belt a cross sectional shape corresponding to that of a truncated isosceles triangle, as is clearly shown in Figs. 1 and 2, wherein the belt is designated by the reference character B. However, it is not intended that the invention be restricted to use of a V-belt, for the reason that a belt that is round in cross section could be used, but with a lesser degree of satisfaction.

The pulley wheel, in its preferred form of construction, comprises the two complements sections 1 and 2 of disk-like character, arranged in coaxial relationship and spaced apart to receive the belt B in the groove formed between them. The inside surfaces of these two sections, or disks, that being the surfaces facing each other, are conically tapered so that, when arranged in assembled relationship, as seen in Figs. 1 and 2, the spaced disks will form an intermediate groove, or channel 3 for receiving the belt B, and it is to be observed that the side surfaces of the groove and the side surfaces of the belt operating in the groove are inclined substantially to the same degree. This insures that the belt will seat snugly in the groove and, under tension, will have an inward wedging action that insures the belt against slippage in the pulley.

The disk section 1 has a coaxial, elongated hub portion 1a extending from the inner face thereof and a relatively short hub portion 1b extending from its outer face. The inner end portion of the hub portion 1a is provided with a longitudinal, diametrically directed slot 5 of considerable extent and opening to the end of the hub for a purpose presently to be explained. Also, the section 1 is provided with a coaxial bore 6 extending entirely therethrough and providing for mounting this part upon the end of a pulley driving shaft 7, which might be a motor shaft or drive shaft of any other power device. It will be noted by reference more particularly to Fig. 2, that the driving shaft 7 terminates within the hub portion 1a, somewhat short of the inner end of the longitudinal slot 5, and it will also be noted that the section 1 is secured against rotation on the driven shaft by means of a set screw 8 that is threaded through the hub portion 1b and into the shaft 7.

The pulley disk, or section 2, has a tubular, coaxial hub portion 2a fitted upon the hub 1a, both for sliding and rotary motion, and permitting of an adjustment of the disk 2 from and toward the disk 1 for the purpose of varying the width of the belt groove 3 thereby to increase or decrease the effective diameter of the pulley; it being understood that, when the spacing of the sections 1 and 2 is increased, the effective pulley diameter becomes less because this permits the belt to move inwardly toward the axis of the pulley. Likewise, it is apparent that when the disks are moved closer together, the effective diameter of the pulley is increased because the belt will be retained at a farther distance from the axis of rotation of the pulley.

Figure 3:
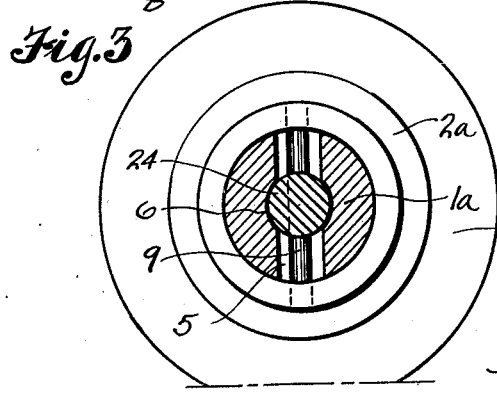
Fig. 3 is a cross section of the pulley taken on the line 3—3 in Fig. 2.

By reference to Fig. 2, it will be noted that the outer end of the hub portion 2a overlaps the inner end portion of the longitudinal slot 5 in the hub portion 1a and that there is a pin 9 fixed in and extending diametrically through the inner end of the hub 2a, which pin extends diametrically through the hub 1a and is contained in the slot 5 as noted in Fig. 3.

Fixed to that inner end portion of the hub 1a, which extends beyond the inner end of hub 2a, is a cage or housing 12. This is of rectangular form and extends in the axial plane of the pulley. At its inner end, this housing has a circular flange 12a formed internally with an annular seat 13 wherein is received the end of the hub 1a. The flange 12a is provided at diametrically opposite sides, as noted in Fig. 1, with pointed extensions 14, the opposite sides of which extensions are symmetrically inclined to a point. These inclined surfaces are designated in Figs. 1 and 4 at E and F, respectively, and they constitute driving surfaces, as later will be understood.

Cage 12 is fixed solidly on the inner end of hub 1a by means of two screws 15 which are extended through flange 12 into the hub as will be observed in Fig. 1.

It will further be observed, by reference to Fig. 1, that the hub portion 2a is formed at its inner end, and at diametrically opposite sides, with V-shaped recesses 16 corresponding in size to the extensions 14 on the flange 12a. The opposite side surfaces of these recesses are designated by reference characters C and D.

The extensions 14 are adapted to seat within the recesses 16 to a greater or lesser degree, depending upon the relative spacing of parts 1 and 2. At no time, however, are the points 14 entirely outside the base lines of the recesses; therefore, a driving relationship is at all times insured.

The cage or housing 12 extends substantially beyond the inner end of the hub 1a and supports therein a Sylphon bellows 20. This bellows is of circular cross section, and is expandible and contractible in its axial direction. At one end it has an axial mounting trunnion 21 seated in a socket 22 in the inner end of an adjusting screw 23, which is threaded through the outer end wall 12b of the cage 12. At its inner end, the bellows is supported by the outer end of a short length of shaft 24, which is slidably contained in the bore 6 of the hub 1a and engages at its inner end against the pin 9. The Sylphon bellows contains a suitable substance that is subjected by temperature changes to expansion and contraction whereby to cause a corresponding expansion or contraction of the bellows in a longitudinal direction. Thus, when the bellows expands, the shaft 24 will be moved inwardly, and by reason of its abutment with the pin 9, will cause a corresponding inward movement of the pulley section 2 toward the section 1. Likewise, when the temperature goes down, the bellows accordingly contracts in length, thereby permitting an outward movement of shaft 24 in hub 1a and a corresponding movement of the pulley section 2 away from the section 1.

The holding of the pulley section 2 relative to the section 1 is facilitated by means of a tensioning spring 28. This is in the form of a cylindrical coil and is disposed about the hub 2a and at one end bears against the outer face of the disk 2, and at its opposite end bears against an adjusting ring 29 that is threaded onto and encircles the cage 12. Tension of the spring may be increased or decreased by adjustment of the ring lengthwise of the cage 12, and by reference to Figs. 1 and 2, it will be observed that the cage is externally threaded at 30 and mounts the ring thereon, and that by rotating the ring, it will be caused to be shifted lengthwise of the case, thus to change the spring tension.

Proper adjustment of the Sylphon bellows in an axial direction may be accomplished by an inward or outward adjustment of the screw 23 which is mounted in the outer end of the cage.

The cage 12 is preferably in the form of a rectangular housing open at its opposite sides in order that the Sylphon may be readily affected by temperature changes and in order that it also may be easily mounted or removed from the cage. The shaft 24 in this instance is not fixed to the Sylphon, but only has supporting and bearing contact at its outer end therewith.

Assuming the pulley to be constructed as shown best in Fig. 2, and to be mounted upon the end of a motor driven shaft 7, as shown, it is quite apparent that when the temperature surrounding the Sylphon is such that the Sylphon has contracted to its maximum extent, then the sections 1 and 2 of the pulley will be permitted to spread apart to their maximum extent which should be such that the belt B will seat in groove 3 close to the hub 1a. It is also to be understood that, in accordance with the rise of temperature, the Sylphon bellows 20 will expand, thereby to move the shaft 24 inwardly, and by reason of the contact of the shaft with the pin 9, to move the disk section 2 toward the disk 1, and thus cause the belt to seat at a farther distance from the axis of the pulley.

It will be understood that, in accordance with the increasing or decreasing of the effective diameter of the pulley, the belt will be driven faster or slower accordingly.

It will be observed by reference more particularly to Fig. 3, that the slot 5 is substantially greater in width than the diameter of the pin 9. Therefore, except when the pointed extensions 14 are fully seated in recesses 16, there will be a relative turning movement of the pulley section 2 on the hub 1a permitted, and this extent of relative movement is such that the driving of the section 2 is always maintained by reason of contact of the extensions 14 with the side surfaces of the recesses 16 in the hub section 2a rather than by reason of the contact of the pin 9 with the side surfaces of the longitudinal slot 5. The desirability for this means of driving the section 2 is by reason of the fact that the inclination of the contacting surfaces E and C, or F and D, causes an inward wedging action of the section 2 toward the section 1, and provides that any vibrations, jolt or jar which may be set in by the belt will be prevented from being transmitted to the thermostatic bellows; it being understood that by reason of the inclination of these contacting driving surfaces, any jar from the belt will be absorbed in slippage between the inclined, contacting surfaces. This will be true regardless of what direction the drive is being driven.

Figure 4:
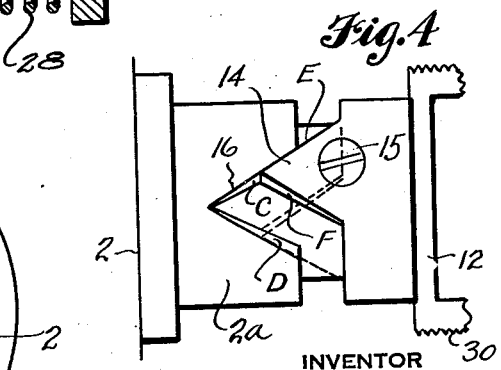
Fig. 4 is a fragmental detail showing parts of the pulley.

Fig. 4 illustrates the driving contact of part 14 with the part 1a and shows surfaces E and C in driving contact. For a reversal in driving direction, it is apparent that surfaces D and F will be in contact.

In Fig. 5, I have illustrated the use of a pulley of the above described character in connection with the circulating fan of a heating plant. In this view, 35 designates a common type of furnace; 36 designates an electric motor equipped with a pulley 37 in accordance with this invention, which, through the mediacy of the belt B drives a pulley 38 which operates the air circulating fan, not shown, within the housing 39. An air pipe 40 leads from the plenum chamber 41 of the furnace to deliver air from the chamber 41 to the area about the thermostatic bellows which controls the adjustment of the pulley 37.

It is to be understood that usual means may be employed to keep the belt at proper tension regardless of adjustment of the pulley.

The operation of this combination of parts is as follows: Coincident with a certain degree of heat being generated in the plenum chamber by the furnace, whether by means of oil burner, stoker, electricity or other means, an electric circuit will be closed through the motor 36 to start the operation of the air circulating fan. At the beginning of any heating operation, the bellows naturally will be contracted because of the relative cold air surrounding it, and the pulley will be adjusted to its reduced effective diameter. After the furnace has started, and the air therein warmed to a desired degree, the air circulating fan is set in motion. Part of the warm air will be diverted through pipe 40 to the area surrounding the Sylphon bellows, associated with the pulley, causing the bellows to expand in accordance with the rise of temperature, thus to cause the effective diameter of the pulley to be increased and the speed of the fan to be increased accordingly.

The advantage in this particular use of the pulley is that when the furnace air is cold and it is not desired that there be a fast circulation thereof, the fan will operate at a minimum speed, but as the furnace increases in heat and more air can be used, the rate of operation of the fan will be increased accordingly. At no time will there be any blast of cold air under circulation.

In the event that such a pulley is used in connection with means which affords facilities for pressure control of the pulley, either by air, steam or liquid, the Sylphon bellows might be replaced by any other suitable means of an expandible and contractible construction and operated by a direct application of pressure thereto.

For illustration, in Fig. 6, the Sylphon has been replaced by a pressure cylinder 50 containing a piston 51 with an extended rod 52 which replaces shaft 24. A pressure pipe 55 leads into the outer end of the cylinder through a swivel coupling 56. Pressure applied through pipe 55 actuates the rod 52 to control the adjustment of the pulley 10 in the same manner as it was accomplished by the Sylphon.

In Figs. 7 and 8 has been illustrated an alternative form of pulley in which the pulley comprises two disks 60 and 61 fixed in parallel spaced relation upon a hub 62 which, in turn, is fixedly mounted on the driven shaft 63. Secured coaxially to these disks, on the inner faces thereof are annular plates 64 and 65 formed of bimetal disks disposed, one upon the other, and secured together in the proper manner. The inner edge portions of these annular plates are inclined toward each other, thus to form the opposite, converging side walls of a belt groove. The bimetal construction of these plates in this case is such that an increase in degree of temperature will cause the side wall portions of the groove to move toward each other. Likewise, any decrease in temperature causes them to move from each other, thereby to increase or decrease the effective diameter of the pulley by reason of allowing the belt to move toward or to be moved away from the axis of rotation.

As will be observed in Fig. 7, each of the bimetal plates is divided along radial lines into a plurality of segments of like sizes, in order to permit the inner portions to flex inwardly or outwardly in accordance with the temperature changes.

It will be evident from the foregoing description, particularly with reference to the use of the devices of Fig. 1 or Fig. 6, that the speed of the driven belt may be varied in accordance with temperature or pressure changes, and that such a pulley has a wide variety of uses. When used in air conditioning systems of the kind disclosed, or similar thereto, it overcomes the objection that has heretofore been voiced, to cold air being rapidly circulated prior to the time required for proper heating at the start of an operation.

It is also contemplated to use the pulley illustrated in Figs. 1 and 2, modified by the removal of the bellows, thus utilizing the spring 28 as a belt tightener. In this case, however, the strength of the spring would be considerably increased. The use of such an arrangement would naturally tend to increase the speed of the fan over a period of time due to the natural wear and stretching of the pulley. This of course would be a desirable feature where air filters are incorporated in the system, for, as these filters become clogged with dust and lint thereon, more air pressure is needed to force the circulated air through them. However, when the filters are renewed, the motor, fan and belt should be readjusted so as to slow the speed of the fan.

Having thus described my invention, what I claim as new therein and desire to secure by Letters Patent is—

1. A variable speed pulley comprising a hub, two relatively adjustable members mounted on the hub and forming the opposite side walls of an inwardly converging belt guide groove wherein a driven or driving belt is seated by contact with said walls, a frame fixed on the hub, and a temperature responsive means mounted in the frame and operatively connected with said adjustable members and adapted to expand and contract in accordance with temperature changes to effect a predetermined change in spacing of said adjustable members whereby to automatically increase or decrease the effective diameter of the pulley.

2. A variable speed pulley comprising a hub portion with a coaxial, disk-like flange forming one side of an inwardly converging belt guide groove, a complemental disk-like flange coaxial of and movably mounted on the said hub and forming the opposite side of the said belt guide groove, and adapted to cooperate with the first mentioned flange to seat a pulley belt, a frame fixed to the hub, a thermostatic bellows seated in the frame and means acted on by the thermostatic bellows to effect change in the spacing of the disks on the hub whereby to vary the effective diameter of the pulley in accordance with temperature changes.

3. A variable speed pulley having a hub portion formed with an axial bore and provided in one end with a diametric longitudinal slot and formed about its other end with a disk-like flange forming one side wall of an inwardly converging belt seating groove, a second disk-like member disposed in opposed relation to the first flange and forming the other side of the belt seating groove, and having a tubular hub portion slidable about the hub first mentioned, a pin fixed in the said tubular hub and passing through the slot in the first mentioned hub, a frame fixed on the slotted end of the hub, a thermostatic bellows seated in the frame and a shaft contained in the hub bore and bearing against said pin and acted on by the said thermostatic bellows to control the spacing of the said flanges, thereby to vary the effective diameter of the pulley in accordance with temperature changes.

4. A device as in claim 3 wherein a coiled spring is enclosed about the pulley hub and bears yieldingly against the frame and against the movable disk and means is provided for regulating the tension of the spring.

5. A device as in claim 3 wherein the second mentioned hub member is slidable and rotatable on the first hub and is formed with V-shaped notches in the end adjacent said housing, and said frame is formed with V-shaped extensions adapted to engage the walls of the notches to effect a driving connection between the hubs.

WILLIAM W. HALLINAN.